(12) United States Patent
Park et al.

(10) Patent No.: US 9,024,859 B2
(45) Date of Patent: May 5, 2015

(54) DATA DRIVER CONFIGURED TO UP-SCALE AN IMAGE IN RESPONSE TO RECEIVED CONTROL SIGNAL AND DISPLAY DEVICE HAVING THE SAME

(75) Inventors: Dong-Won Park, Hwaseong-si (KR); Bonghyun You, Yongin-si (KR); JaeSung Bae, Suwon-si (KR); Donggyu Lee, Seoul (KR); Seokha Hong, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 219 days.

(21) Appl. No.: 13/604,013

(22) Filed: Sep. 5, 2012

(65) Prior Publication Data

US 2013/0286003 A1    Oct. 31, 2013

(30) Foreign Application Priority Data

Apr. 30, 2012    (KR) .................. 10-2012-0045601

(51) Int. Cl.
*G09G 3/36*    (2006.01)
*G06F 3/038*    (2013.01)

(52) U.S. Cl.
CPC .............. *G06F 3/038* (2013.01); *G09G 3/3685* (2013.01); *G09G 2310/0286* (2013.01); *G09G 2310/0294* (2013.01)

(58) Field of Classification Search
CPC .................................................. G09G 3/3685
USPC ....................................................... 345/100
See application file for complete search history.

(56) References Cited

U.S. PATENT DOCUMENTS

| | | | |
|---|---|---|---|
| 6,124,840 A * | 9/2000 | Kwon ........................... | 345/100 |
| 6,816,139 B2 | 11/2004 | Park | |
| 7,656,381 B2 * | 2/2010 | Luo ............................... | 345/100 |
| 7,948,466 B2 * | 5/2011 | Lee ............................... | 345/100 |
| 2003/0030615 A1 * | 2/2003 | Maeda et al. .................. | 345/90 |
| 2003/0112230 A1 * | 6/2003 | Maeda et al. .................. | 345/204 |
| 2004/0104907 A1 | 6/2004 | Jeon | |
| 2004/0130520 A1 * | 7/2004 | Maeda et al. .................. | 345/100 |
| 2005/0083356 A1 | 4/2005 | Roh et al. | |
| 2006/0232591 A1 * | 10/2006 | Lee ............................... | 345/502 |
| 2007/0071360 A1 | 3/2007 | Kuroki et al. | |
| 2007/0153024 A1 * | 7/2007 | Miller ........................... | 345/660 |
| 2008/0225036 A1 | 9/2008 | Song et al. | |
| 2009/0146935 A1 | 6/2009 | Song et al. | |
| 2009/0153597 A1 | 6/2009 | Sheu et al. | |
| 2010/0110061 A1 | 5/2010 | Chen et al. | |
| 2010/0156965 A1 | 6/2010 | Kim et al. | |

FOREIGN PATENT DOCUMENTS

| | | | | |
|---|---|---|---|---|
| EP | 0617554 A1 * | 9/1994 | ............. | H04N 5/262 |
| JP | 2005309304 A * | 11/2005 | ............... | G09G 3/36 |
| JP | 2011064914 A * | 3/2011 | ............... | G09G 3/36 |

(Continued)

*Primary Examiner* — Adam J Snyder
(74) *Attorney, Agent, or Firm* — F. Chau & Associates, LLC

(57) ABSTRACT

A display apparatus includes pixels, gate lines and data lines, a gate driver driving the gate lines, a data driver driving the data lines, and a timing controller controlling the gate and data drivers and applying a resolution control signal to the data driver. The data driver applies a first line data signal to the pixels connected to a first gate line of the gate lines from image data and a second line data signal to a second gate line of the gate lines based on the first line data signal in response to a shift start pulse signal when the resolution control signal indicates an up-scaling mode.

15 Claims, 10 Drawing Sheets

(56) References Cited

FOREIGN PATENT DOCUMENTS

| KR | 1020000065497 | 11/2000 | | |
|---|---|---|---|---|
| KR | 1020030058763 | 7/2003 | | |
| KR | 102005054520 A | * 6/2005 | ............... | G09G 3/36 |
| KR | 1020050054520 | 6/2005 | | |
| KR | 1020070002955 | 1/2007 | | |
| KR | 1020100131586 | 12/2010 | | |

* cited by examiner

DATA DRIVER CONFIGURED TO UP-SCALE AN IMAGE IN RESPONSE TO RECEIVED CONTROL SIGNAL AND DISPLAY DEVICE HAVING THE SAME

CROSS-REFERENCE TO RELATED APPLICATION

This application claims priority to Korean Patent Application No. 10-2012-0045601, filed on Apr. 30, 2012, the disclosure of which is incorporated by reference in its entirety herein.

TECHNICAL FIELD

Embodiments of the present invention relate to a display device, and more particularly to a display device with an up-scaling function.

DISCUSSION OF RELATED ART

A full high definition (FHD) display device is a display device that provides a resolution that is substantially higher than that of a standard-definition television. Examples of a FHD resolution include 1920 by 1080 pixels, 1280 by 720 pixels, etc. A display device that provides a resolution that is substantially higher than FHD provides an ultra-high definition (UHD or UD) resolution. Examples of UD include 3840 by 2160 pixels. When a display device having the UD resolution is connected to a host that provides an FHD image signal, the FHD image signal needs to be converted to a UD image signal. The display device can be manufactured to include a separate circuit that converts the FHD image into a UD image. However, due to the additional circuit, the manufacturing cost of the display device increases.

SUMMARY

According to an exemplary embodiment of the invention, a display apparatus includes a plurality of pixels, a plurality of gate lines, a plurality of data lines, a gate driver that drives the gate lines, a data driver that drives the data lines, and a timing controller that controls the gate driver and the data driver (e.g., in response to an input signal and a control signal, which are provided from an external source). The timing controller applies a resolution control signal to the data driver. In response to a shift start pulse signal when the resolution control signal indicates an up-scaling mode, the data driver applies a first line data signal to the pixels connected to a first gate line of the gate lines from image data (e.g., provided from the timing controller) and a second line data signal to a second gate line of the gate lines based on the first line data signal.

In an exemplary embodiment, the first gate line and the second gate line are disposed adjacent each other and sequentially driven.

In an exemplary embodiment, the data driver applies a data signal to the pixels connected to a first data line of the data lines from the image data (e.g., provided from the timing controller) and a second data signal to a second data line of the data lines based on the first data signal.

In an exemplary embodiment, the data driver includes a logic circuit that outputs a first start pulse signal as a second start pulse signal, a resolution control circuit that outputs the shift start pulse signal, which is activated when odd-numbered gate lines of the gate lines are driven, in response to the second start pulse signal and the resolution control signal, a shift register that starts a shift operation in response to the shift start pulse signal to sequentially output a plurality of latch clock signals respectively corresponding to the data lines, a latch part that latches the image data provided from the timing controller in response to the latch clock signals, a digital-to-analog converter that converts a digital signal output from the latch part to an analog signal, and an output buffer that amplifies the analog signal output from the digital-to-analog converter to drive the data lines.

In an exemplary embodiment, the shift start pulse signal is activated when the first gate line is driven and inactivated when the second gate line is driven.

In an exemplary embodiment, the resolution control circuit includes a flip-flop (e.g., a toggle T flip-flop) that latches the first start pulse signal to output the second start pulse signal, a logic circuit that receives the first start pulse signal and the second start pulse signal to output a third start pulse signal, and a multiplexer that outputs one of the second and third start pulse signals in response to the resolution control signal as the shift start pulse signal.

In an exemplary embodiment, the latch part includes a plurality of first latches respectively corresponding to the data lines and a plurality of second latches. Each first latch latches the image data in synchronization with a corresponding latch clock signal of the latch clock signals, and each second latch latches an output of a corresponding first latch of the first latches in response to a load signal (e.g., from the timing controller).

In an exemplary embodiment, odd-numbered second latches of the second latches output a first data signal applied to the pixels connected to first data lines of the data lines, and even-numbered second latches of the second latches output a second data signal applied to the pixels connected to second data lines of the data lines.

In an exemplary embodiment, the latch part includes a first mode controller that outputs a first mode signal in response to the shift start pulse signal and the load signal, a plurality of first latches respectively corresponding to the data lines, each of the first latches latching the image data in synchronization with a corresponding latch clock signal of the latch clock signals, a plurality of calculation circuits respectively corresponding to even-numbered first latches of the first latches, and a plurality of second latches, each of which latches outputs of odd-numbered first latches of the first latches and the calculation circuits in response to a load signal (e.g., from the timing controller). Each of the calculation circuits outputs an output of a corresponding first latch of the first latches to a corresponding second latch of the second latches when the first mode signal has a first level and outputs a calculation result signal based on the outputs of the odd-numbered first latches adjacent to each other to the corresponding second latch when the first mode signal has a second level.

In an exemplary embodiment, each of the calculation circuits outputs the calculation result signal corresponding to an average of the outputs of the odd-numbered first latches adjacent each other to the corresponding second latch when the first mode signal has the second level.

In an exemplary embodiment, the latch part includes a second mode controller that outputs a second mode signal in response to the shift start pulse signal and the load signal, a plurality of first latches respectively corresponding to the data lines, each of the first latches latching the image data in synchronization with a corresponding latch clock signal of the latch clock signals, a plurality of second latches respectively corresponding to the first latches, each of the second latches latching an output of a corresponding first latch of the first latches in response to a corresponding latch clock signal of the latch clock signals, a plurality of calculation circuits respectively corresponding to the second latches, and a plurality of third latches, each of which latches an output of a corresponding calculation circuit of the calculation circuits in response to a load signal from the timing controller. Each of the calculation circuits outputs an output of a corresponding second latch of the second latches to a corresponding third latch of the third latches when the second mode signal has a first level and outputs a calculation result signal to the corresponding third latch based on input and output of a corresponding first latch of the first latches when the second mode signal has a second level.

In an exemplary embodiment, each of the calculation circuits outputs the calculation result signal corresponding to an average of the input and output of the corresponding first latch to the corresponding second latch when the second mode signal has the second level.

According to an exemplary embodiment of the invention, a data driver includes a resolution control circuit that outputs a shift start pulse signal, which is activated when odd-numbered gate lines are driven, in response to a first start pulse signal and a resolution control signal, a shift register that starts a shift operation in response to the shift start pulse signal to sequentially output a plurality of latch clock signals respectively corresponding to a plurality of data lines, a latch part that latches an image data from an external source in response to the latch clock signals, a digital-to-analog converter that converts a digital signal output from the latch part to an analog signal, and an output buffer that amplifies the analog signal output from the digital-to-analog converter to drive the data lines. When the resolution control signal indicates an up-scaling mode, the latch part applies the image data to pixels connected to odd-numbered data lines as first image data and applies second image data to the even-numbered data lines. The second image data for a corresponding one of the even-numbered data lines is based on data of the first image data applied to two of the odd-numbered data lines adjacent the one even-numbered data line.

In an exemplary embodiment, the latch part includes a first mode controller that outputs a first mode signal in response to the shift start pulse signal and a load signal, a plurality of first latches respectively corresponding to the data lines, each of the first latches latching the image data in synchronization with a corresponding latch clock signal of the latch clock signals, a plurality of calculation circuits respectively corresponding to even-numbered first latches of the first latches, and a plurality of second latches, each of which latches outputs of odd-numbered first latches of the first latches and the calculation circuits in response to the load signal. Each of the calculation circuits outputs an output of a corresponding first latch of the first latches to a corresponding second latch of the second latches when the first mode signal has a first level and outputs a calculation result signal based on the outputs of the odd-numbered first latches adjacent to each other to the corresponding second latch when the first mode signal has a second level.

In an exemplary embodiment, the resolution control circuit includes a flip-flop that latches the first start pulse signal to output a second start pulse signal, a logic circuit that receives the first start pulse signal and the second start pulse signal to output a third start pulse signal, and a multiplexer that outputs one of the second and third start pulse signals in response to the resolution control signal as the shift start pulse signal.

According to an exemplary embodiment of the invention, a data driver includes a driver circuit configured to receive a resolution control signal set to one of a normal mode and an up-scaling mode and generate a first shift start pulse signal. The driver circuit is configured to output a first data signal based on first data of image data to first pixels connected to a first gate line, and output a second data signal to second pixels connected to a second gate line adjacent the first gate line based on the same first data, in response to the first shift start pulse signal when the resolution control signal is set to the up-scaling mode. The driver circuit is configured to output the first data signal to the first pixels, and output a third data signal based on second other data of the image data to the second pixels, in response to the first shift start pulse signal when the resolution control signal is set to the normal mode.

In an exemplary embodiment, when the resolution control signal is set to the up-scaling mode, the first data signal is identical to the second data signal. In an alternate embodiment when the resolution control signal is set to the up-scaling mode, odd-pixels of the first pixels receive a signal based on respective single bits of the first data, and even-pixels of the first pixels receive a signal based on an average of respective adjacent bit pairs of the first data. In another alternate embodiment when the resolution control signal is set to the up-scaling mode, respective adjacent pixel pairs of the first pixels both receive a signal based on respective bits of the first data signal, and respective adjacent pixel pairs of the second pixels receive a signal based on an average of a corresponding one of the respective single bits and a corresponding one of respective single bits of the third data signal.

In an exemplary embodiment, the driver circuit includes a toggle flip-flop having a data input terminal and a clock input terminal both configured to receive a second shift start pulse signal, an AND gate configured to receive the second shift start pulse signal and an output of the toggle flip-flop, a multiplexer configured to output one of the output of the AND gate and the second shift start pulse signal as the first shift start pulse signal based on the resolution control signal, and a shift register configured to control output of the image data based on receipt of the first shift start pulse signal.

According to at least one exemplary embodiment of the invention, a data driver has an up-scaling function. Thus, image signals of a low resolution may be displayed on a display device of a high resolution without employing a separate up-scaler.

BRIEF DESCRIPTION OF THE DRAWINGS

Embodiments of the present invention will become readily apparent by reference to the following detailed description when considered in conjunction with the accompanying drawings wherein.

DETAILED DESCRIPTION

Hereinafter, the present invention will be described more fully with reference to the accompanying drawings, in which exemplary embodiments of the invention are shown. The described embodiments may be modified in various different ways, without departing from the spirit or scope of the present invention. As used herein, the singular forms, "a," "an" and "the" are intended to include the plural forms as well, unless the context clearly indicates otherwise.

Figure 1:
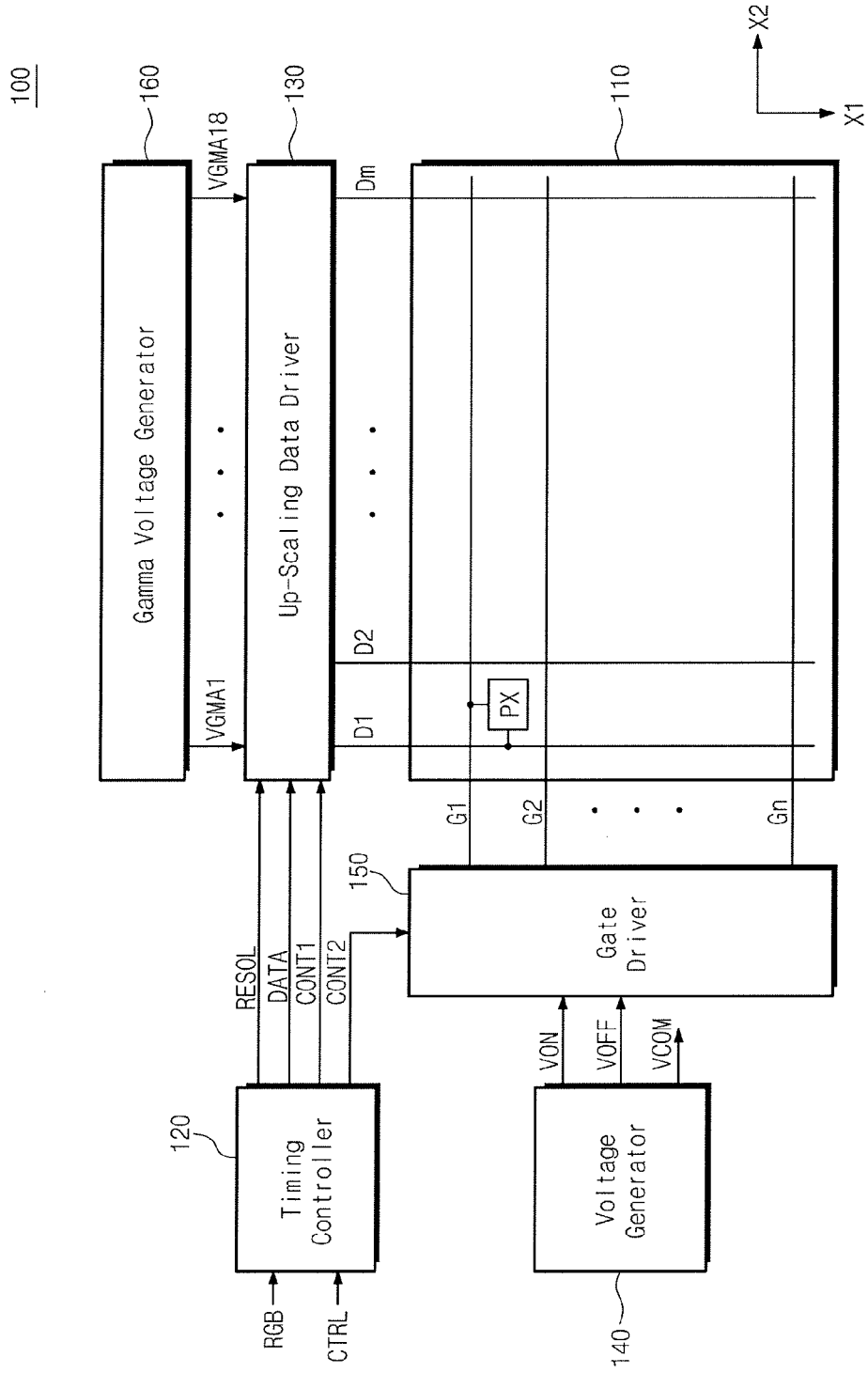
FIG. 1 illustrates a block diagram showing a liquid crystal display according to an exemplary embodiment of the present invention.

FIG. 1 illustrates a block diagram showing a display device according to an exemplary embodiment of the present invention. Hereinafter, a liquid crystal display will be described as the display device, but the display device is not limited to a liquid crystal display. For example, in alternate embodiments the display device may be a plasma display, an electroluminescent display, a light emitting diode display, etc.

Referring to FIG. 1, a display device 100 includes a display panel 110, a timing controller 120, an up-scaling data driver 130, a voltage generator 140, a gate driver 150, and a gamma voltage generator 160.

The display panel 110 includes a plurality of data lines D1 to Dm extended in a first direction X1, a plurality of gate lines G1 to Gn extended in a second direction X2 to cross the data lines D1 to Dm, and a plurality of pixels PX. The pixels PX may be arranged in areas defined by the data lines D1 to Dm and the gate lines G1 to Gn.

In an exemplary embodiment, each pixel PX includes a switching transistor connected to a corresponding data line of the data lines and a corresponding gate line of the gate lines, a liquid crystal capacitor connected to the switching transistor, and a storage capacitor connected to the switching transistor.

The timing controller 120 receives image signals RGB and control signals CTRL, such as a vertical synchronization signal Vsync, a horizontal synchronization signal Hsync, a main clock signal MCLK, a data enable signal DE, etc., to control the image signals RGB. The control signals CTRL may be received from an external source. The timing controller 120 applies a resolution control signal RESOL, image data DATA, and a first control signal CONT1 to the up-scaling data driver 130 and applies a second gate signal CONT2 to the gate driver 150. In an exemplary embodiment, the first control signal CONT1 includes a first start pulse signal SP1, a clock signal CLK, and a line latch signal LOAD, and the second control signal CONT2 includes a vertical synchronization signal STV1, an output enable signal OE, and first and second gate pulse signals CPV1 and CPV2.

The gamma voltage generator 160 generates a plurality of gamma voltages VGMA1 to VGMA18. While the gamma voltage generator 160 is illustrated as generating 18 gamma voltages, embodiments of the invention are not limited thereto. For example, in alternate embodiments of the invention, the gamma voltage generator 160 can generate fewer than 18 gamma voltages or more than 18 gamma voltages.

The up-scaling data driver 130 drives the data lines D1 to Dm using the gamma voltages VGMA1 to VGMA18 in response to the resolution control signal RESOL, the image data DATA, and the first control signal CONT1. In an exemplary embodiment, the gamma voltage generator 160 is not present, and the up-scaling data driver 130 drives the data lines D1 to Dm using the image data DATA in response to the resolution control signal RESOL and the first control signal CONT1

The voltage generator 140 generates a gate-on voltage VON, a gate-off voltage VOFF, and a common voltage VCOM, which are used to operate the display panel 110.

The gate driver 150 drives the gate lines G1 to Gn in response to the second control signal CONT2 from the timing controller 120 and the gate-on and off voltages VON and VOFF from the voltage generator 140. In an exemplary embodiment, the gate driver 150 includes a gate driver integrated circuit (IC). In an exemplary embodiment, the gate driver IC is configured to include an amorphous silicon gate (ASG) circuit using an amorphous-silicon thin film transistor (a-Si TFT).

In an exemplary embodiment, switching transistors arranged in one row of the panel 110 and connected to one gate line (e.g., G1) are turned on during a period in which the gate-on voltage VON is applied to the one gate line by the gate driver 150. The up-scaling data driver 130 provides gray-scale voltages corresponding to the data signal DATA to the data lines D1 to Dm. The gray-scale voltages applied to the data lines D1 to Dm are applied to the pixels of the row through the turned-on switching transistors. The period in which the switching transistors in the one row are turned on is referred to as one horizontal period or 1H. For example, this period may correspond to one period of the data enable signal.

When a resolution of the image signals RGB is the same as a resolution of the display panel 110, the display device 100 is operated in a normal mode. When the resolution of the image signals RGB is lower than the resolution of the display panel 110, the display device is operated in an up-scaling mode. In an embodiment, the timing controller 120 is configured to determine the resolution of the image signals RGB. For example, the timing controller 120 can compare the size of the input image signals RGB input during a given period against a pre-defined threshold size. If the result is lower than the threshold size, the timing controller 120 can indicate that up-scaling is required.

The timing controller 120 uses the resolution control signal RESOL to indicate the current mode. The resolution control signal RESOL may be set indicate whether the current mode is the up-scaling mode or the normal mode. For example, in an embodiment, the resolution control signal RESOL is set to a high level to indicate the up-scaling mode and to a low level to indicate the normal mode. The up-scaling data driver 130 is operated in the up-scaling mode when the resolution control signal RESOL indicates the up-scaling mode. Hereinafter, a configuration and an operation of the up-scaling data driver 130 according to at least one embodiment of the invention will be described in further detail.

Figure 2:
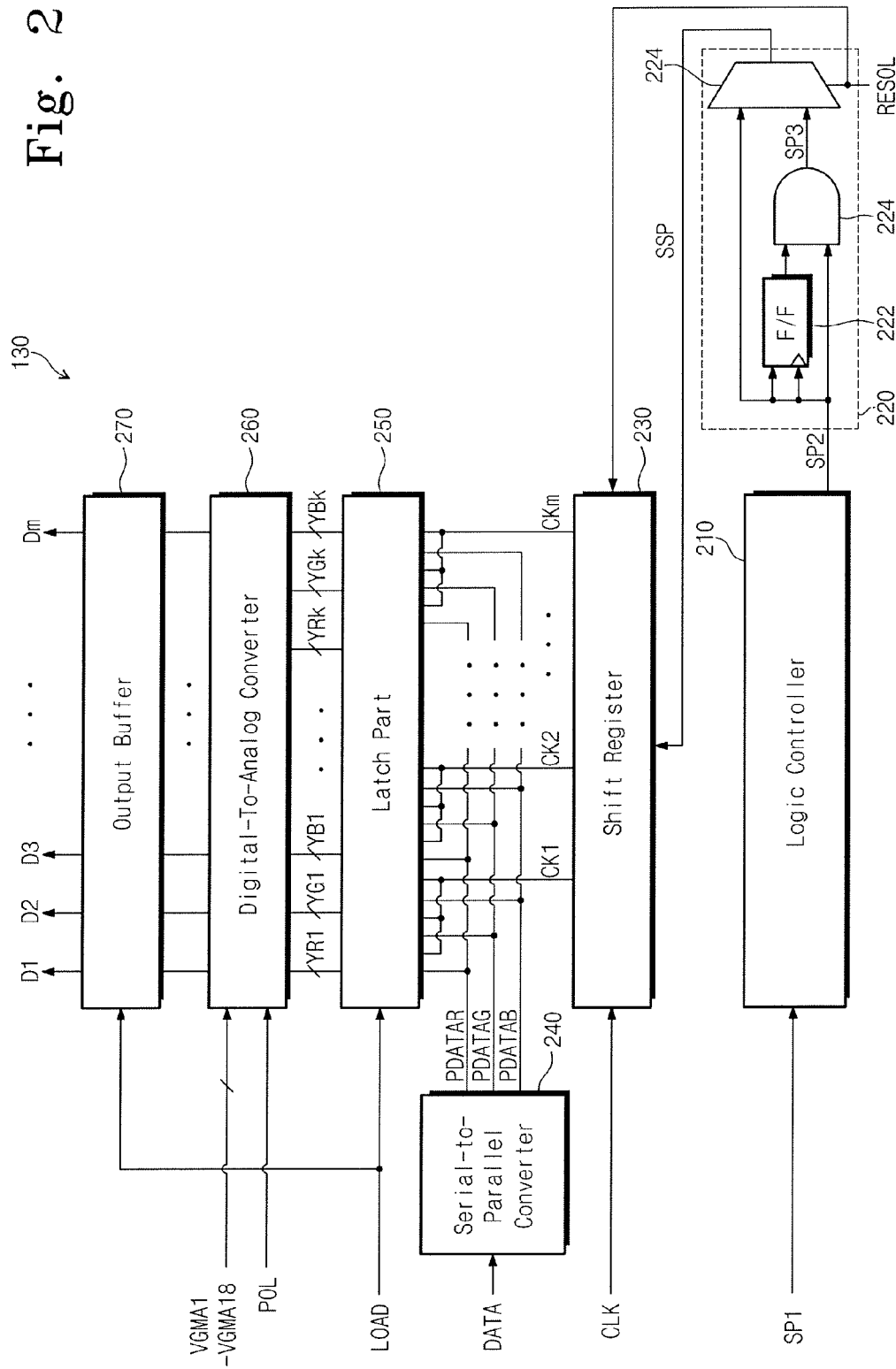
FIG. 2 illustrates a block diagram showing an up-scaling data driver shown in FIG. 1 according to an exemplary embodiment of the present invention.

FIG. 2 illustrates a block diagram of the up-scaling data driver shown in FIG. 1 according to an exemplary embodiment of the invention.

Referring to FIG. 2, the up-scaling data driver 130 includes a logic controller 210, a resolution control circuit 220, a shift register 230, a serial-to-parallel converter 240, a latch part 250, a digital-to-analog converter 260, and an output buffer 270.

In FIG. 2, the first start pulse signal SP1, the clock signal CLK, and the line latch signal LOAD are included in the first control signal CONT1 output from the timing controller 120 shown in FIG. 1.

The logic controller 210 outputs the first start pulse signal SP1 as a second start pulse signal SP2. In an exemplary embodiment, the second start pulse signal SP2 is the same as the first start pulse signal SP1. In an exemplary embodiment, the second start pulse signal SP2 is a delayed version of the first start pulse signal SP1.

The resolution control circuit 220 outputs a shift start pulse signal SSP in response to the second start pulse signal SP2 and the resolution control signal RESOL. In an exemplary embodiment, the resolution control circuit 220 includes a toggle T flip-flop 222, an AND gate 224, and a multiplexer 226. The T flip-flop 222 latches the second start pulse signal SP2 in synchronization with the second start pulse signal SP2. For example, the second start pulse signal SP2 may be applied to a data input terminal and a clock input terminal of the T flip-flop 222. The AND gate 224 receives the output from the T flip-flop 222 and the second start pulse signal SP2 and outputs a third start pulse signal SP3. The multiplexer 226 outputs one of the second start pulse signal SP2 and the third start pulse signal SP3 from the AND gate 224 in response to the resolution control signal RESOL as the shift start pulse signal SSP. For example, when the resolution control signal RESOL is a low level signal indicating the normal mode, the multiplexer 226 outputs the second start pulse signal SP2 as the shift start pulse signal SSP. On the contrary, when the resolution control signal RESOL is a high level signal indicating the up-scaling mode, the multiplexer 226 outputs the third start pulse signal SP3 output from the AND gate 224 as the shift start pulse signal SSP.

The shift register 230 starts its shift operation in response to the shift start pulse signal SSP and sequentially activates latch clock signals CK1 to CKm in synchronization with the clock signal CLK. In an exemplary embodiment, the shift register 230 activates the latch clock signals respectively corresponding to two data lines adjacent each other at the same time when the resolution control signal RESOL indicates the up-scaling mode. In an exemplary embodiment, the shift register activates the two adjacent latch clock signals simultaneously or substantially simultaneously.

The serial-to-parallel converter 240 converts the image data DATA from the timing controller 120 shown in FIG. 1 to parallel red data PDATAR, parallel green data PDATAG, and parallel blue data PDATAB and outputs the parallel red data PDATAR, the parallel green data PDATAG, and the parallel blue data PDATAB to the latch part 250.

The latch part 250 latches the parallel red data PDATAR, the parallel green data PDATAG, and the parallel blue data PDATAB in synchronization with the latch clock signals CK1 to CKm from the shift register 230 and provides red data YR1 to YRk, green data YG1 to YGk, and blue data YB1 to YBk to the digital-to-analog converter 260. In an exemplary embodiment, the latch part 250 simultaneously provides the red data YR1 to YRk, green data YG1 to YGk, and blue data YB1 to YBk to the digital-to-analog converter 260

The digital-to-analog converter 260 receives the gamma voltages VGMA1 to VGMA18 from the gamma voltage generator 160 shown in FIG. 1 and outputs the gray-scale voltages corresponding to the red data YR1 to YRk, the green data YG1 to YGk, and the blue data YB1 to YBk to the output buffer 270 in response to a polarity inversion signal POL.

In response to the line latch signal LOAD, the output buffer 270 drives the data lines D1 to Dm using the gray-scale voltages corresponding to the red data YR1 to YRk, the green data YG1 to YGk, and the blue data YB1 to YBk from the latch part 250. In an exemplary embodiment, m is obtained by multiplying 3 by k. For example, if there are 4 instances of red data, 4 instances of blue data, and 4 instances of green data (e.g., k=4), then there will be 12 data signals (e.g., m=12).

Figure 3:
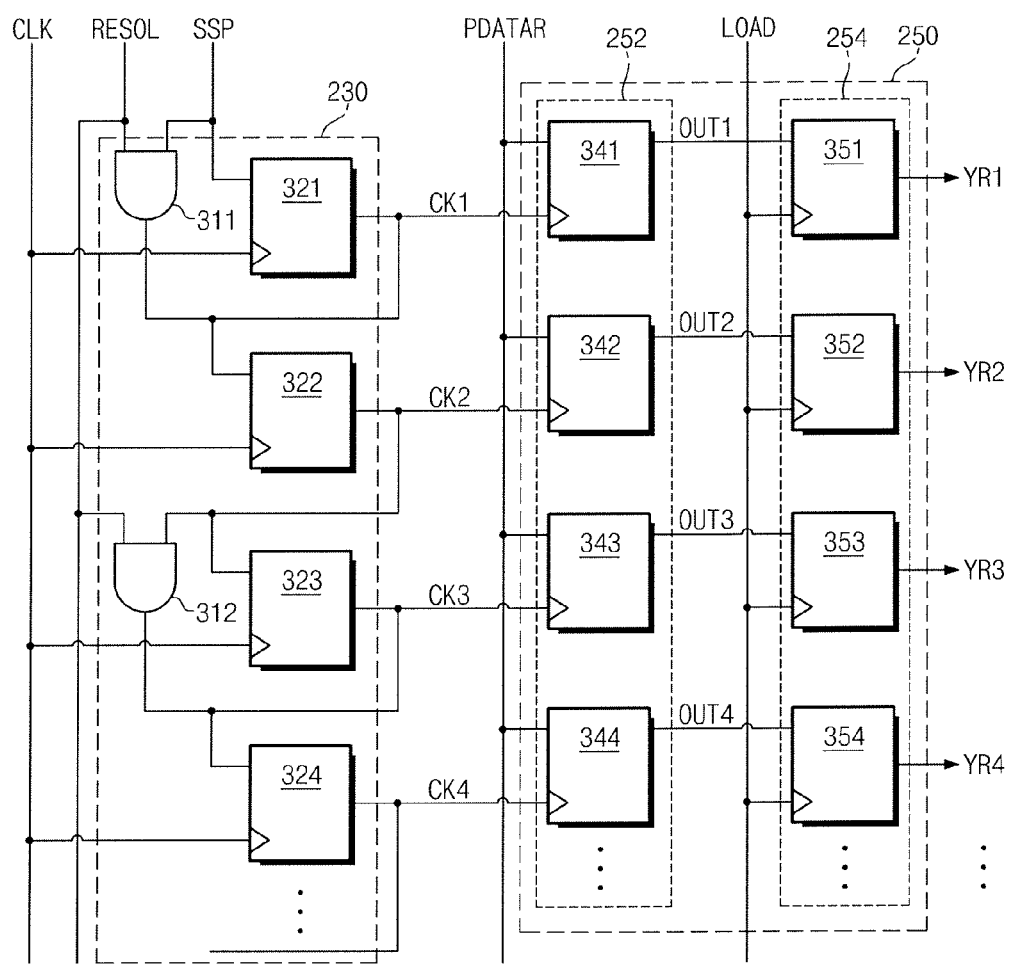
FIG. 3 illustrates a view showing a shift register and a latch part shown in FIG. 2 according to an exemplary embodiment of the present invention.

FIG. 3 illustrates a view showing portions of the shift register and the latch part shown in FIG. 2 according to an exemplary embodiment of the invention. For the convenience of explanation, FIG. 3 shows a circuit for processing the parallel red data PDATAR. However, the shift register and the latch part may further include similar circuits to process the parallel green data PDATAG and the parallel blue data PDATAB.

Referring to FIG. 3, the shift register 230 includes AND gates 311 and 312 and latches 321, 322, 323, and 324. The AND gate 311 receives the resolution control signal RESOL and an input signal of the odd-numbered latch 321 and 323, and applies its output signal to the even-numbered latch 322 and 324 as an input signal. The AND gate 312 receives the resolution control signal RESOL and an input signal of the odd-numbered latch 323, and applies its output to the even-numbered latch 324 as an input signal.

The latches 321 to 324 latch their respective input signals in synchronization with the clock signal CLK and output latch clock signals CK1 to CK4, respectively. A first latch 321 receives the shift start pulse signal SSP and outputs the latch clock signal CK1. A second latch 322 receives the latch clock signal CK1 output from the first latch 321 and outputs the latch clock signal CK2. A third latch 323 receives the latch clock signal CK2 output from the second latch 322 and outputs the latch clock signal CK3. A fourth latch 324 receives the latch clock signal CK3 output from the third latch 323 and outputs the latch clock signal CK4. Therefore, when the shift start pulse signal SSP is activated to a high level, the latch clock signals CK1 to CK4 are sequentially activated in synchronization with the clock signal CLK.

In an exemplary embodiment, the latch part 250 includes a first latch part 252 and a second latch part 254. The first latch part 252 includes first latches 341, 342, 343, and 344. The first latches 341 to 344 respectively correspond to the latches 321 to 324 in the shift register 230. The first latches 341 to 344 latch the parallel red data PDATAR from the serial-to-parallel converter 240 shown in FIG. 2 in synchronization with the latch clock signals CK1 to CK4 output from the latches 321 to 324 so as to output output signals OUT1, OUT2, OUT3, and OUT4.

The second latch part 254 includes second latches 351, 352, 353, and 354. The second latches 351 to 354 respectively correspond to the first latches 341 to 344. The second latches 351 to 354 output the output signals OUT1 to OUT4 from the first latches 341 to 344 as red output signals YR1 to YR4 in synchronization with the line latch signal LOAD.

The shift register 230 having the above-mentioned configuration sequentially activates the latch clock signals CK1 to CK4 in synchronization with the clock signal CLK when the shift start pulse signal SSP is activated to the high level during the low level of the resolution control signal RESOL. The latch part 250 receives the parallel red data PDATAR in synchronization with the latch clock signals CK1 to CK4 and outputs the red output signals YR1 to YR4 in response to the line latch signal LOAD.

When the resolution control signal RESOL is the high level signal indicating the up-scaling mode, two latches 321 and 322 in the shift register 230 output both the latch clock signals CK1 and CK2 in response to the shift start pulse signal SSP. The output of both the latch clock signals CK1 and CK2 by the shift register 230 may occur simultaneously or substantially simultaneously. In at least one embodiment of the invention, the output signals OUT1 and OUT2 output from the first latches 341 and 342 in the latch part 250 are the same. Similarly, the output signals OUT3 and OUT4 output from the first latches 343 and 344 in the latch part 250 may also be the same.

Figure 4:
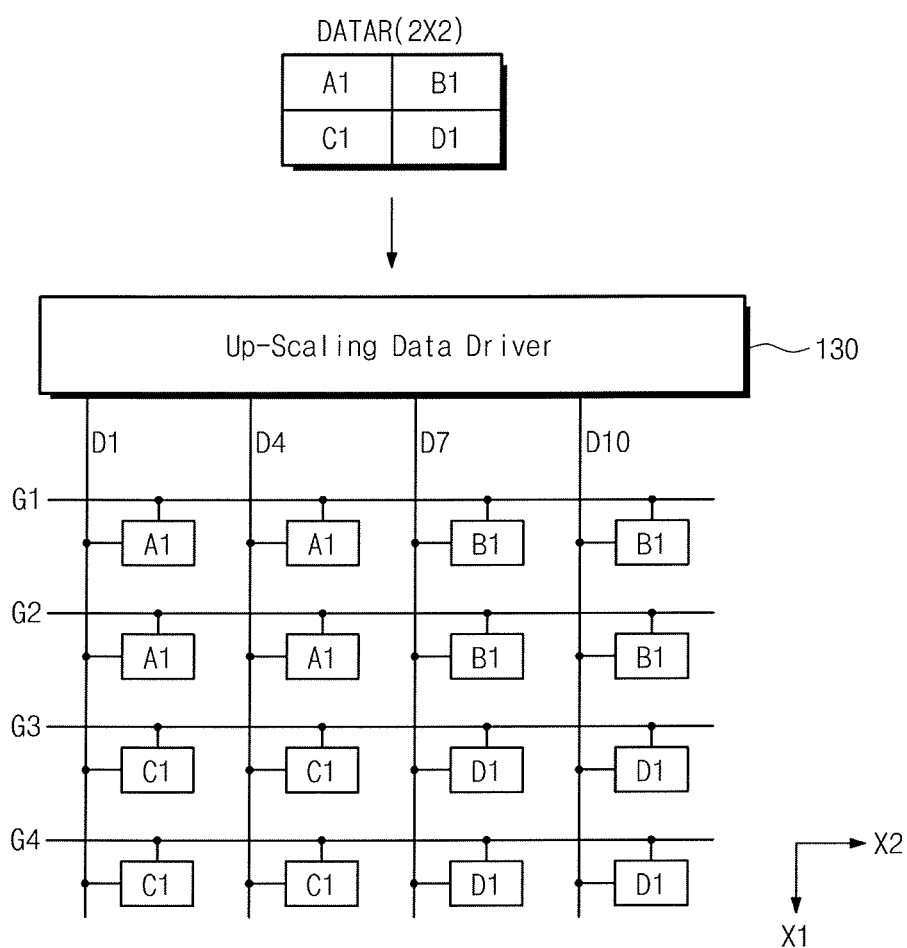
FIG. 4 illustrates a view showing 4 by 4 pixel data obtained from 2 by 2 parallel red data in an up-scaling mode.

FIG. 4 illustrates a view showing 4 by 4 pixel data obtained from 2 by 2 parallel red data in an up-scaling mode.

Referring to FIG. 4, when the image data DATA output from the timing controller 120 has an FHD resolution (e.g., 1920 by 1080 pixels) and the display panel 110 shown in FIG. 1 has a UD resolution (e.g., 3840 by 2160 pixels), the number of the image data DATA may be increased by two times in each of horizontal and vertical directions.

For example, among the image data DATA output from the timing controller 120, 2 by 2 red image data DATAR for red pixels may be enlarged to a certain size, e.g., to 4 by 4 red image data.

According to a nearest neighbor method inserted image data has the same value as neighbor image data. This method may be used to reduce image distortion caused by resolution variation. For example, as shown in FIG. 4, the up-scaling data driver 130, to which the nearest-neighbor method is applied, converts the red image data A1 and B1 to red image data A1, A1, B1, and B1, which are increased by two times in the second direction X2 when compared to the red image data A1 and B 1. In this example, the pixels connected to the gate line G2 receive the same data as the data applied to the pixels connected to the gate line G1. Therefore, the number of the red image data in the first direction X1 is increased two times.

Although not shown in FIG. 4, when red, green, and blue pixels are alternately arranged in the second direction X2, the red pixels are connected to the data lines D1, D4, D7, and D10, the green pixels are connected to the data lines D2, D5, D8, and D11, and the blue pixels are connected to the data lines D3, D6, D9, and D12. Thus, the red image data A1, A1, B1, and B1 may be applied to the pixels through the data lines D1, D4, D7, and D10.

Figure 5:
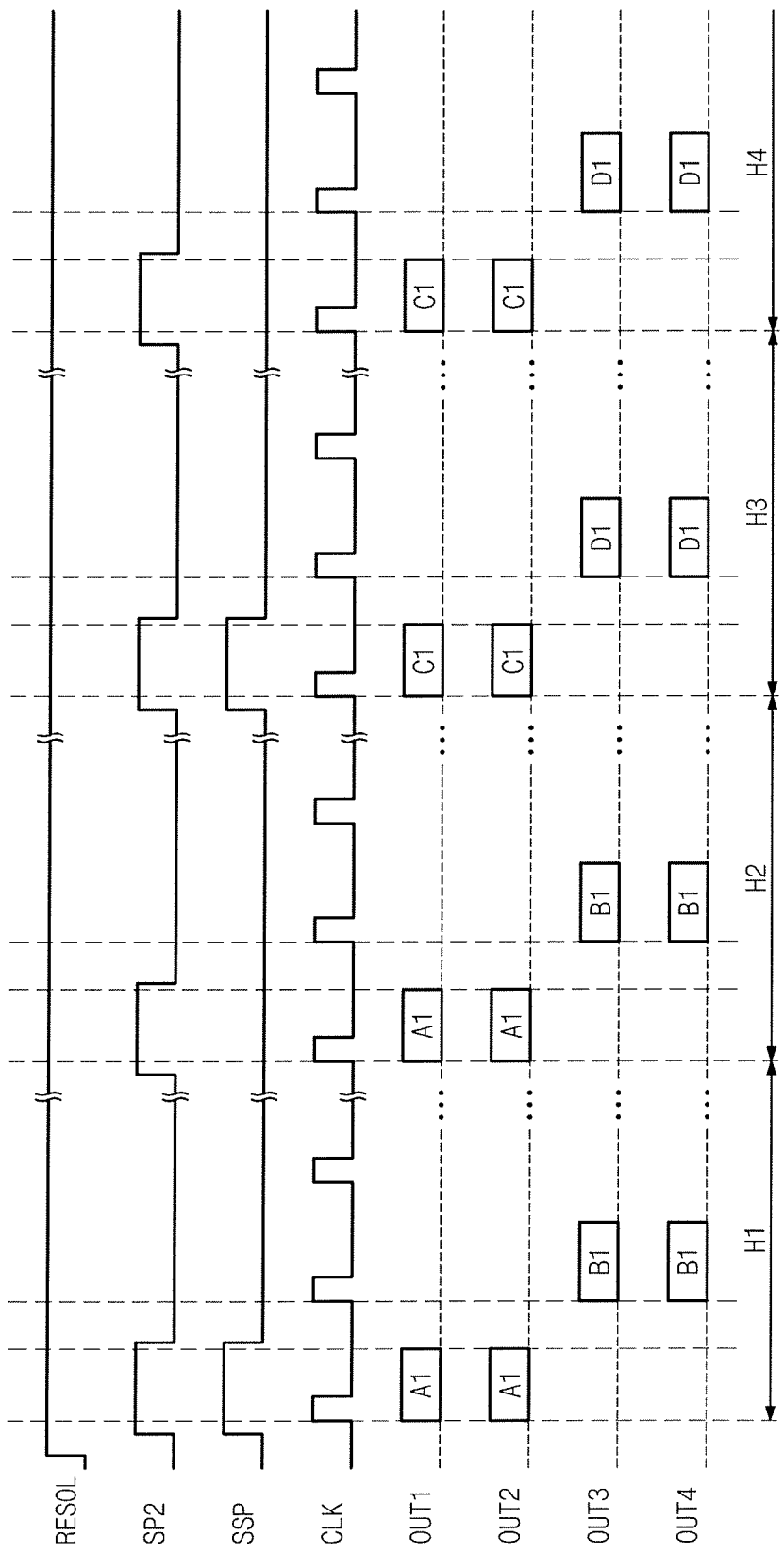
FIG. 5 illustrates a timing diagram explaining an operation of a shift register and a line latch shown in FIG. 3 using a nearest-neighbor method shown in FIG. 4.

FIG. 5 illustrates a timing diagram explaining an operation of the shift register and the line latch shown in FIG. 3 using the nearest-neighbor method shown in FIG. 4.

Referring to FIGS. 2 to 5, the T flip-flop 222 of the resolution control circuit 220 outputs an inverted output signal obtained by inverting a previous output signal therefrom in synchronization with the second start pulse signal SP2 input to the clock terminal thereof. When the resolution control signal RESOL has the high level that indicates the up-scaling mode, the resolution control circuit 220 outputs the shift start pulse signal SSP that is the same as the second start pulse signal SSP2 during odd-numbered horizontal periods H1 and H3 and outputs the shift start pulse signal SSP having the low level during even-numbered horizontal periods H2 and 144.

Thus, when the resolution control signal RESOL has the high level that indicates the up-scaling mode, the shift register 230 sequentially activates the latch clock signals CK1 to CKm in synchronization with the shift start pulse signal SSP in the odd-numbered horizontal periods H1 and H3 and does not output the latch clock signals CK1 to CKm in the even-numbered horizontal periods H2 and H4.

The latch part 250 repeatedly applies the red data YR1 to YRk, the green data YG1 to YGk, and blue data YB1 to YBk to the digital-to-analog converter 260 twice. Accordingly, the gray-scale voltages, which are the same as the gray-scale voltages applied to the pixels connected to the odd-numbered gate lines G1, G3, and G5, are applied to the pixels connected to the even-numbered gate lines G2, G4, and G6. Therefore, image signals, which are increased by two times in the first direction when compared to the image signals RGB from the external source, may be provided to the display panel 110.

In addition, the shift register 230 activates the latch clock signals respectively corresponding to two data lines adjacent each other when the resolution control signal RESOL indicates the up-scaling mode. The activation of the adjacent latch signals by the shift register 230 may occur simultaneously or substantially simultaneously. Therefore, image signals, which are increased by two times in the second direction X2 when compared to the input image signals RGB, may be provided to the display panel 110.

Figure 6:
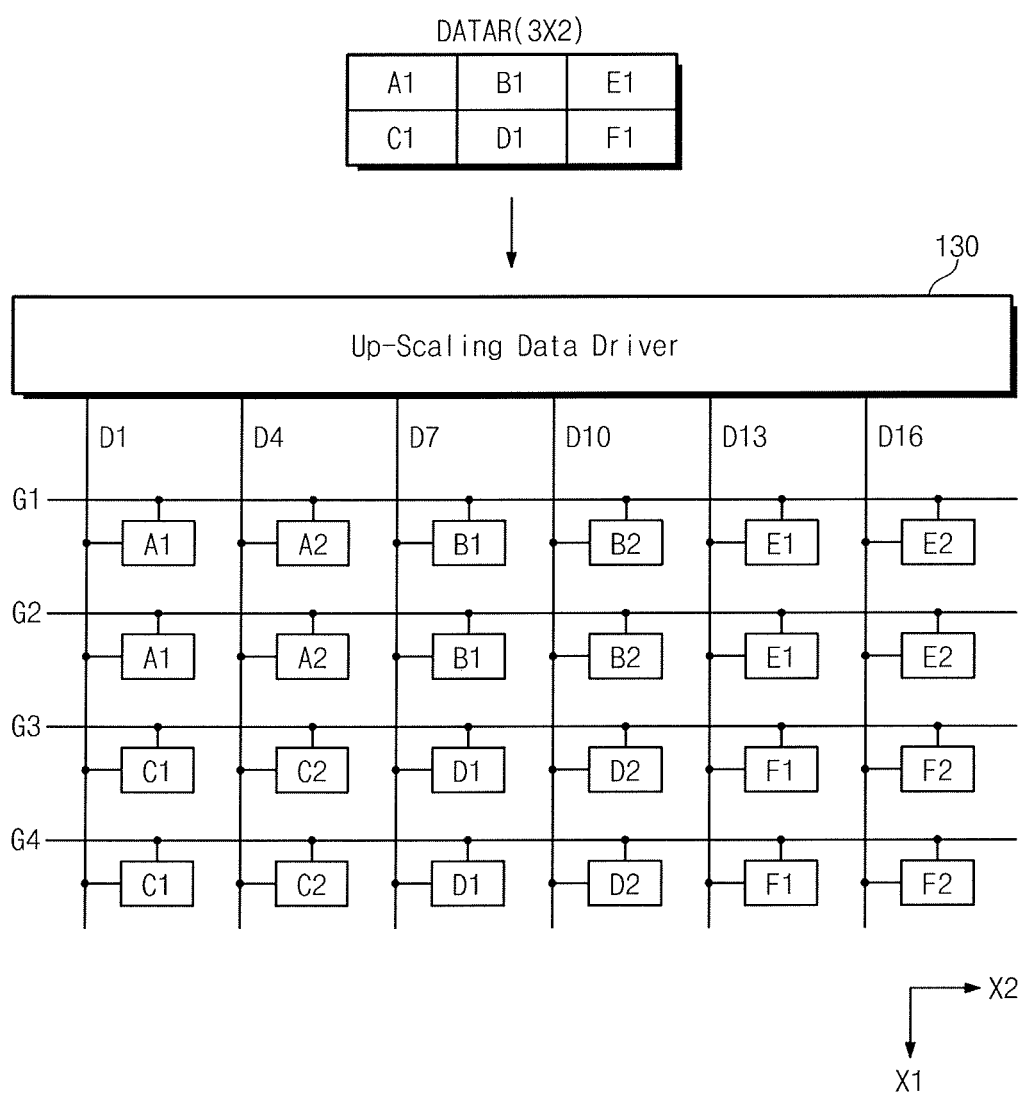
FIG. 6 illustrates a view showing 6 by 4 pixel data obtained from 3 by 2 image data using an up-scaling data driver in an up-scaling mode.

FIG. 6 illustrates a view showing 6 by 4 pixel data obtained from 3 by 2 image data using the up-scaling data driver in an up-scaling mode.

Referring to FIG. 6, a bi-linear interpolation method is used to interpolate two image data adjacent in left and right directions to generate an average value between the two adjacent image data. This method may minimize the image distortion caused by resolution variation.

For example, as shown in FIG. 6, the red image data A1, B 1, and E1 are increased by two times in the second direction X2. For example, the red image data of A1, B1, and E1 is converted to red image data of A1, A2, B1, B2, E1, and E2. In this example, an interpolated image data A2 is the average value of A1 and B1, an interpolated image data B2 is the average value of B1 and E1. In an embodiment, the red image data A1, B1, and E1 corresponds to one row of a 3×2 row of red data. As shown in FIG. 6, the pixels connected to the even-numbered gate lines G2 and G4 receive the same image data as the image data applied to the pixels connected to the odd-numbered gate lines G1 and G3. As a result, image signals RGB having a FHD resolution (e.g., 1920 by 1080) may be displayed through the display panel 110 having a UD resolution (e.g., 3840 by 2160).

Figure 7:
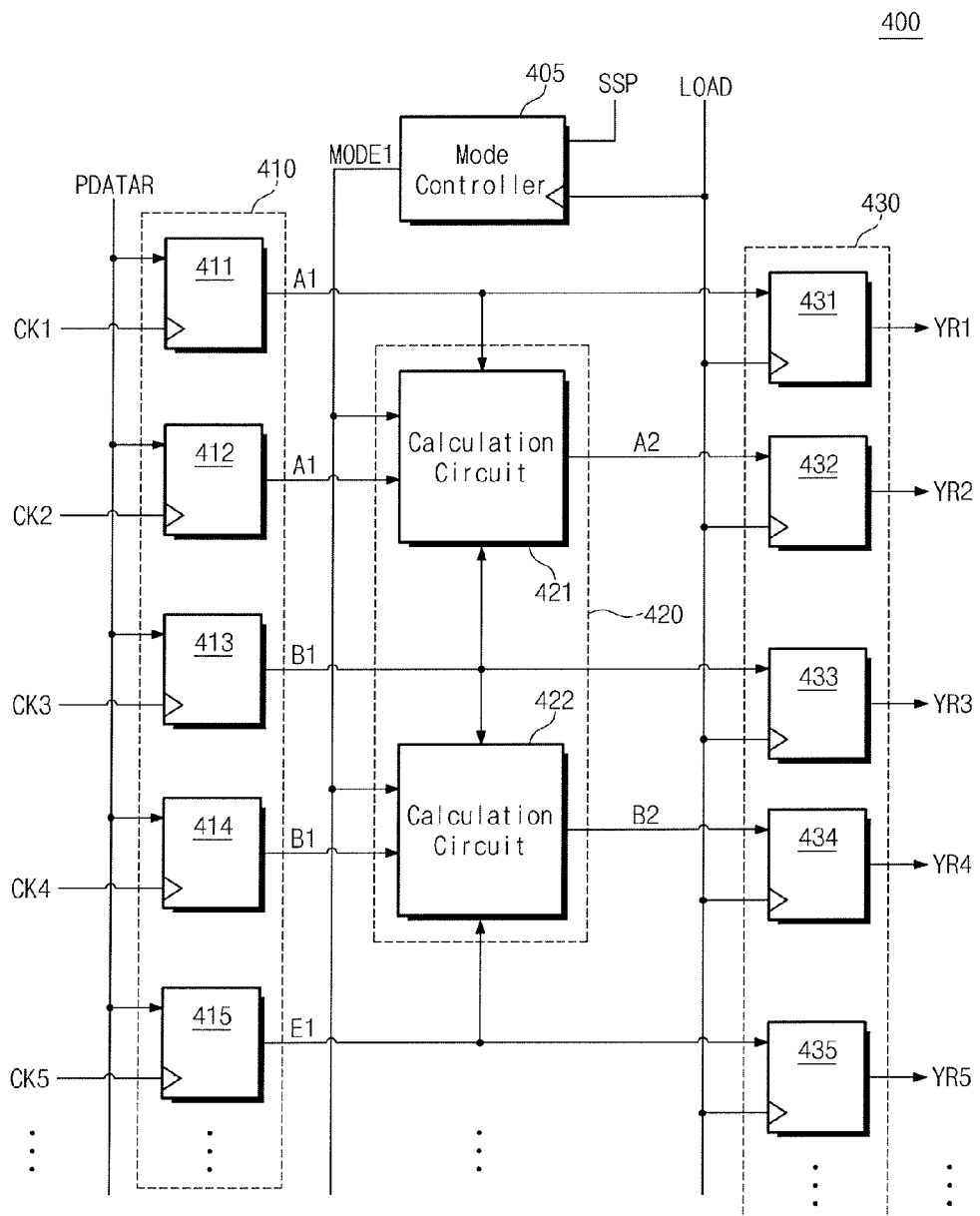
FIG. 7 illustrates a view showing a latch part of an up-scaling data driver to which a bi-linear interpolation method is applied according to an exemplary embodiment of the present invention.

FIG. 7 illustrates a view showing a part of a latch part of an up-scaling data driver to which a bi-linear interpolation method is applied according to an exemplary embodiment of the present invention. For the convenience of explanation, FIG. 7 shows a circuit for processing the parallel red data PDATAR. However, the latch part may further include circuits to process the parallel green data PDATAG and the parallel blue data PDATAB.

Referring to FIG. 7, a latch part 400 includes a mode controller 405, a first latch part 410, a calculation part 420, and a second latch part 431. The mode controller 405 outputs the shift start pulse signal SSP as a first mode signal MODE1 in synchronization with the line latch signal LOAD.

The first latch part 410 includes first latches 411, 412, 413, 414, and 415. The first latches 411 to 415 latch the parallel red data PDATAR from the serial-to-parallel converter 240 shown in FIG. 2 in synchronization with the latch clock signals CK1 to CK5 output from the shift register 230 shown in FIG. 2 to output output signals OUT1 to OUT5. For example, output signals OUT1 to OUT5 may correspond to data A1, A1, B1, B1, and E1, respectively.

The second latch part 430 includes second latches 431, 432, 433, 434, and 435. The second latches 431 to 435 output input signals applied thereto as red output signals YR1, YR2, YR3, and YR4 in response to the line latch signal LOAD.

The calculation part 420 includes calculation circuits 421 and 422. The calculation circuits 421 and 422 correspond to the even-numbered first latches 412 and 414. The calculation circuits 421 and 422 receive the outputs of the even-numbered first latches 412 and 414 and the outputs of odd-numbered first latches 411 and 413. For example, the calculation circuit 421 receives the outputs of the adjacent odd-numbered first latches 411 and 413 and the calculation circuit 422 receives the outputs of the adjacent odd-numbered first latches 413 and 415. The output signals from the calculation circuits 421 and 422 are applied to the even-numbered second latches 432 and 434, respectively. The outputs of the odd-numbered first latches 411, 413, and 415 are provided to odd-numbered second latches 431, 433, and 435, respectively.

The operation of the latch part 400 having the above-mentioned structure according to at least one embodiment of the invention is as follows. The mode controller 405 outputs the shift start pulse signal SSP in response to the line latch signal LOAD as a first mode signal MODE1. When the shift start pulse signal SSP is at the high level, the calculation circuits 421 and 422 apply the outputs of the even-numbered first latches 412 and 414 to the even-numbered second latches 432 and 434 without any change. Therefore, the outputs from the even-numbered first latches 412 and 414 are provided to the second latches 432 and 434 during odd-numbered horizontal periods in a normal mode or an up-scaling mode.

Further, the calculation circuits 421 and 422 generate image signals that will be applied to the even-numbered second latches 432 and 434 based on the outputs from the adjacent odd-numbered first latches during even-numbered horizontal periods in the up-scaling mode.

For example, if it is assumed that the first latches 411 and 412 output the image data A1, the first latches 413 and 414 output the image data B1, and the first latch 415 outputs the image data E1 in the up-scaling mode, the calculation circuit 421 provides the image data A2 to the second latch 432 based on the image data A1 and B1 from the odd-numbered first latches 411 and 423. For example, the calculation circuit 421 can calculate the average of image data A1 and B1 to generate image data A2. The calculation circuit 422 provides the image data B2 to the second latch 434 based on the image data B1 and E1 from the odd-numbered first latches 413 and 415. For example, the calculation circuit 422 can calculate the average of image data B1 and E1 to generate image data B2. Thus, the parallel red data A1, B1, and E1 may be increased two times in the second direction X2, e.g., the red data A1, A2, B1, B2, E1, and E2.

As described above, since the shift start pulse signal SSP is maintained in the low level during the even-numbered horizontal periods in the up-scaling mode, the shift register 230 does not output the latch clock signals CK1 to CKm. Therefore, the up-scaling data driver 130 may provide the red data A1, A2, B1, B2, E1, and E2, which are applied to the pixels connected to the gate line G1, to the pixels connected to the gate line G2. As a result, image signals, which are increased by two times in the first direction X1 when compared to input image signals RGB, may be provided to the display panel 110.

Figure 8:
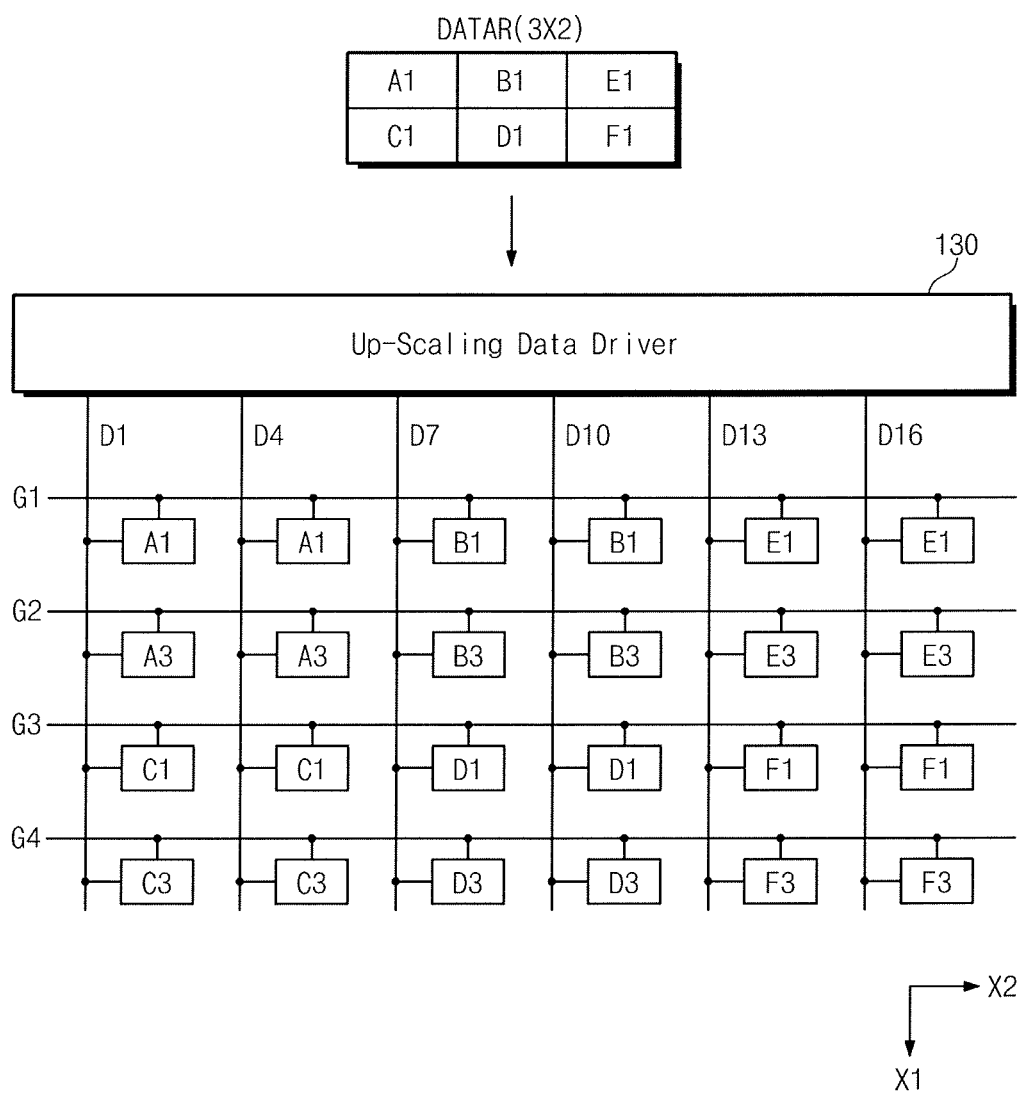
FIG. 8 illustrates a view showing 6 by 4 pixel data obtained from 3 by 2 image data using an up-scaling data driver in an up-scaling mode.

FIG. 8 illustrates a view showing 6 by 4 pixel data obtained from 3 by 2 image data using the up-scaling data driver in the up-scaling mode.

Referring to FIG. 8, a cubic interpolation method is used to interpolate two image data adjacent in upper and lower directions to generate an average value between the two adjacent image data, which may minimize the image distortion caused by resolution variation.

For example, as shown in FIG. 8, the image data provided to the pixels connected to the even-numbered gate line G2 are generated based on the image data provided to the pixels connected to the gate lines G1 and G3, which are adjacent gate line G2. Accordingly, an interpolated image data A3 is the average value of A1 and C1 and an interpolated image data B3 is the average value of B1 and D1. In the present exemplary embodiment, the interpolated image data in the second direction X2 has the same values as the image data adjacent thereto as the above-described nearest-neighbor method. For example, the parallel red data A1, B1, and E1 are increased two times in the second direction X2, and thus parallel red data A1, A1, B1, B1, E1, and E1 are applied to the pixels connected to the odd-numbered gate line G1. In addition, the parallel red data C1, D1, and F1 are increased two times in the second direction X2, so that parallel red data C1, C1, D1, D1, F1, and F1 are applied to the pixels connected to the odd-numbered gate line G3. Parallel red data A3, A3, B3, B3, E3, and E3 provided to the pixels connected to the even-numbered gate line G2 are generated based on the parallel red data provided to the odd-numbered gate lines G1 and G3. Parallel red data C3, C3, D3, D3, F3, and F3 provided to the pixels connected to the even-numbered gate line G4 are generated based on the parallel red data provided to the odd-numbered gate lines G3 and G5. As a result, image signals RGB having a FHD resolution (e.g., 1920 by 1080) may be displayed through the display panel 110 with a UD resolution (e.g., 3840 by 2160).

Figure 9:
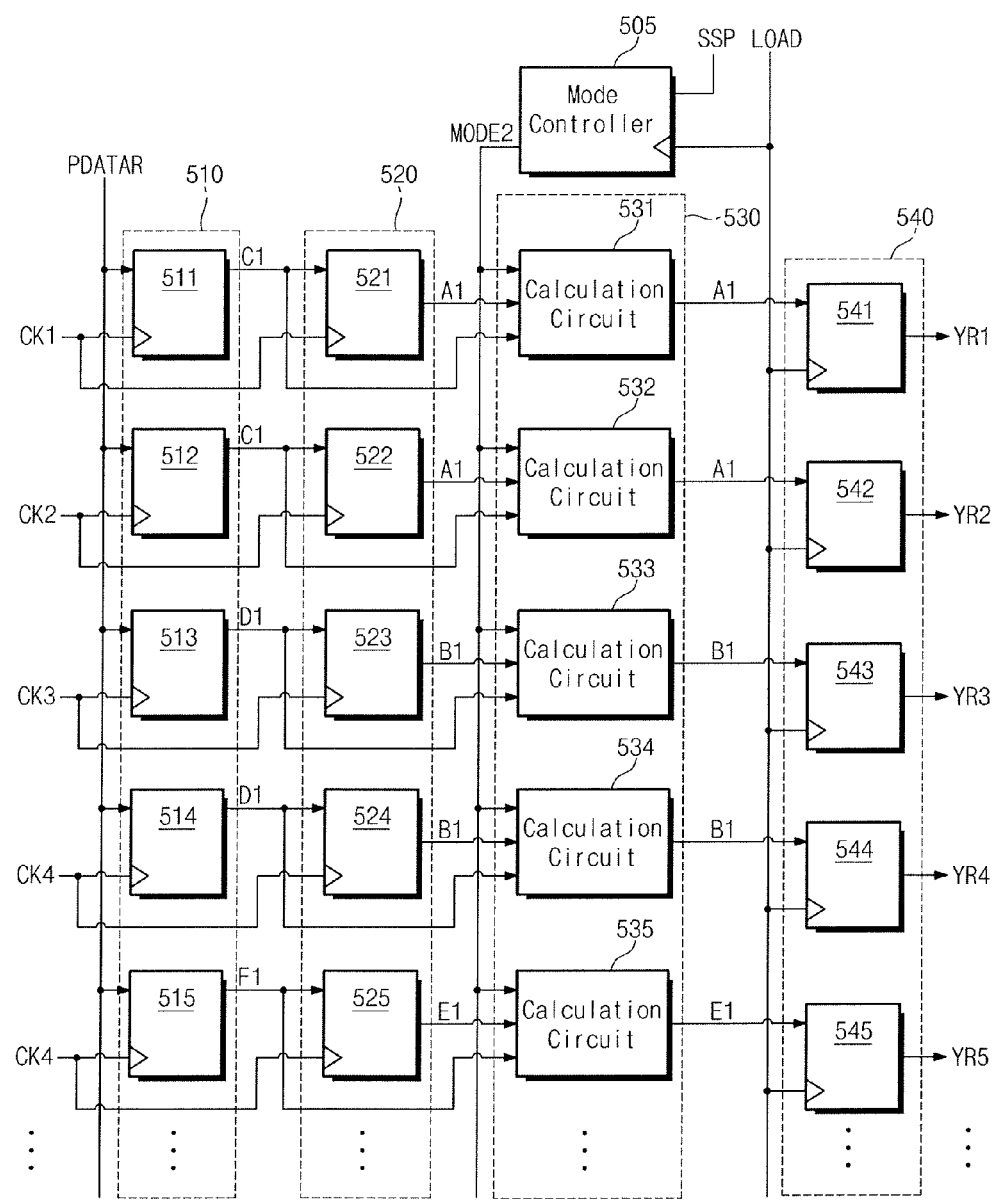
FIG. 9 illustrates a view showing a latch part of an up-scaling data driver to which a cubic interpolation method is applied according to an exemplary embodiment of the present invention.

FIG. 9 illustrates a view showing part of a latch part of an up-scaling data driver to which a cubic interpolation method is applied according to an exemplary embodiment of the present invention. For the convenience of explanation, FIG. 9 shows a circuit for processing the parallel red data PDATAR. However, the latch part may further include circuits to process the parallel green data PDATAG and the parallel blue data PDATAB.

Referring to FIG. 9, a latch part 500 includes a mode controller 505, a first latch part 510, a second latch part 520, a calculation part 530, and a third latch part 540. The mode controller 505 outputs the shift start pulse signal SSP as a second mode signal MODE2 in response to the line latch signal LOAD.

The first latch part 510 includes first latches 511, 512, 513, 514, and 515. The first latches 511 to 515 latch the parallel red data PDATAR from the serial-to-parallel converter 240 shown in FIG. 2 in synchronization with the latch clock signals CK1 to CK5 output from the shift register 230 shown in FIG. 2.

The second latch part 520 includes second latches 521, 522, 523, 524, and 525. The second latches 521 to 525 respectively correspond to the first latches 511 to 515. Each of the second latches 521 to 525 latches an output signal of a corresponding first latch of the first latches 511 to 515 in synchronization with a corresponding latch clock signal of the latch clock signals CK1 to CK5.

The calculation part 530 includes calculation circuits 531, 532, 533, 534, and 535 respectively corresponding to the second latches 521 to 525. Each of the calculation circuits 531 to 535 receives the output signal of a corresponding second latch of the second latches 521 to 525 and the output signal of a corresponding first latch of the first latches 511 to 515. For example, the calculation circuit 531 receives the output signal of the first latch 511 and the output signal of the second latch 521. The calculation circuit 532 receives the output signal of the first latch 512 and the output signal of the second latch 522. The calculation circuit 533 receives the output signal of the first latch 513 and the output signal of the second latch 523. The calculation circuit 534 receives the output signal of the first latch 514 and the output signal of the second latch 524. The calculation circuit 535 receives the output signal of the first latch 515 and the output signal of the second latch 525.

The third latch part 540 includes third latches 541, 542, 543, 544, and 545 respectively corresponding to the calculation circuits 531 to 535. The third latches 541 to 545 output the signals from the calculation circuits 531 to 535 as red data YR1 to YR5 in synchronization with the line latch signal LOAD.

The operation of the latch part 500 having the above-mentioned configuration according to at least one embodiment of the invention is as follows. The second latches 521 to 525 respectively output the red image data A1, A1, B1, B1, and E1, which are provided to the pixels connected to the gate line G1, in response to the latch clock signals CK1 to CK5. In response to the latch clock signals CK1 to CK5, the first latches 511 to 515 respectively output the red image data C1, C1, D1, D1, and F1 to be provided to the pixels connected to the gate line G3.

The mode controller 505 outputs the second mode signal MODE2 in response to the line latch signal LOAD and the shift start pulse signal SSP. The second mode signal MODE2 is set to the high level during the odd-numbered horizontal periods in the normal mode or the up-scaling mode. When the second mode signal MODE2 is set to the high level, each of the calculation circuits 531 to 535 outputs the output from the corresponding second latch of the second latches 521 to 525 to the corresponding third latch of the third latches 541 to 545 without any change. Therefore, during the odd-numbered horizontal periods H1, H3, and H5 of the normal mode or the up-scaling mode, the outputs of the second latches 521 to 525 are applied to the third latches 541 to 545, respectively.

Figure 10:
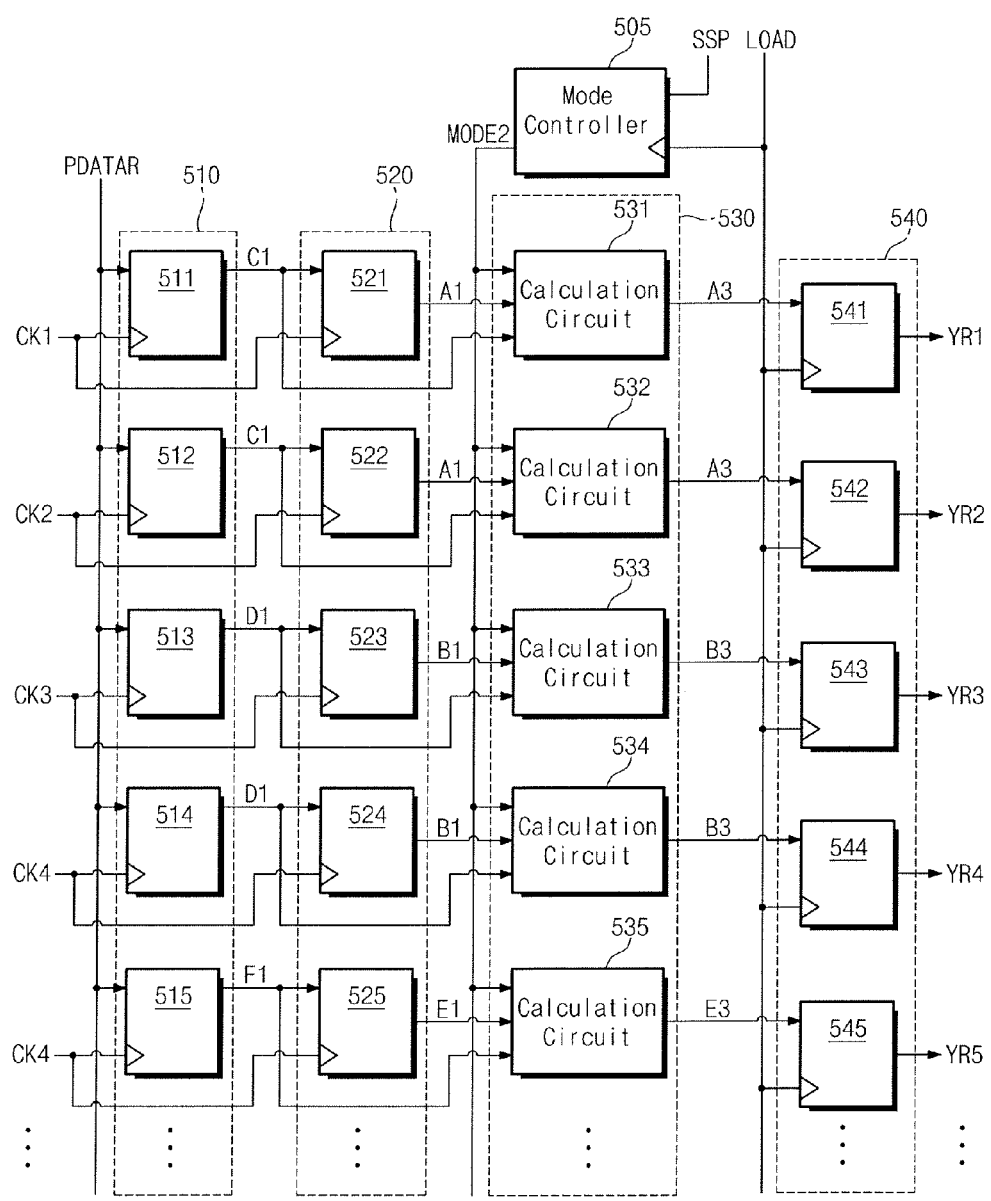
FIG. 10 is a view showing signals output from a calculation circuit of the latch part shown in FIG. 9 during even-numbered horizontal periods of the up-scaling mode.

FIG. 10 is a view showing signals output from a calculation circuit of the latch part shown in FIG. 9 during even-numbered horizontal periods of the up-scaling mode.

Referring to FIG. 10, the second mode signal MODE2 output from the mode controller 505 is set to the low level during the even-numbered horizontal periods H1, H3, and H5 in the up-scaling mode. When the second mode signal MODE2 is at the low level, the calculation circuits 531 to 535 generates the image signals to be applied to the third latches 541 to 545 based on the output signals from the first latches 511 to 515 and the output signals from the second latches 521 to 525.

For example, the calculation circuit 531 outputs the image signal A3 based on the output signal C1 of the first latch 511 and the output signal A1 of the second latch 521. The calculation circuit 532 outputs the image signal A3 based on the output signal C1 of the first latch 512 and the output signal A1 of the second latch 522. The calculation circuit 533 outputs the image signal B3 based on the output signal D1 of the first latch 513 and the output signal B1 of the second latch 523. The calculation circuit 534 outputs the image signal B3 based on the output signal D1 of the first latch 514 and the output signal B1 of the second latch 524. The calculation circuit 535 outputs the image signal E3 base on the output signal F1 of the first latch 515 and the output signal E1 of the second latch 525. As described above, the 3 by 2 red data DATAR shown in FIG. 8 is increased two times in the second direction X2 and provided as 6 by 4 pixels to the display panel 110.

While the up-scaling data driver 130 shown in FIG. 1 has been described above using the nearest-neighbor method, the bi-linear interpolation method, or the cubic interpolation method, the driver 130 is not limited thereto. For example, a combination of the nearest-neighbor method, the bi-linear interpolation method, or the cubic interpolation method may be applied using the up-scaling data driver 130.

Although exemplary embodiments of the present invention have been described above, the present invention is not limited to these exemplary embodiments, but, on the contrary, is intended to cover various modifications and equivalent arrangements includes within the spirit and scope of the disclosure.

What is claimed is:

1. A display apparatus comprising:
    a plurality of pixels, a plurality of gate lines, and a plurality of data lines;
    a gate driver configured to drive the gate lines;
    a data driver configured to drive the data lines; and
    a timing controller configured to control the gate driver and the data driver and apply a resolution control signal to the data driver,
    wherein, the data driver is configured to apply a first line data signal to the pixels connected to a first gate line among the gate lines from input image data and apply a second line data signal to the pixels connected to a second gate line among the gate lines based on the first line data signal, in response to a shift start pulse signal when the resolution control signal indicates an up-scaling mode,
    wherein the data driver comprises:
        a flip-flop configured to latch a first start pulse signal to output a second start pulse signal;
        a logic circuit configured to receive the first start pulse signal and the second start pulse signal to output a third start pulse signal; and
        a multiplexer configured to output one of the first and third start pulse signals as the shift start pulse signal in response to the resolution control signal.

2. The display apparatus of claim 1, wherein the first gate line and the second gate line are disposed adjacent each other and are sequentially driven.

3. The display apparatus of claim 1, wherein the data driver applies a data signal to the pixels connected to a first data line of the data lines from the input image data and a second data signal to the pixels connected to a second data line of the data lines based on the first data signal.

4. The display apparatus of claim 1, wherein the data driver comprises:
    a logic circuit configured to output a start pulse signal as the first start pulse signal;
    a shift register configured to start a shift operation in response to the shift start pulse signal to sequentially output a plurality of latch clock signals respectively corresponding to the plurality of the data lines;
    a latch part configured to latch the input image data in response to the plurality of the latch clock signals;
    a digital-to-analog converter configured to convert a digital signal output from the latch part to an analog signal; and
    an output buffer configured to amplify the analog signal output from the digital-to-analog converter to drive the plurality of the data lines.

5. The display apparatus of claim 4, wherein the shift start pulse signal is activated when the first gate line is driven and inactivated when the second gate line is driven.

6. The display apparatus of claim 4, wherein the latch part comprises:
    a plurality of first latches respectively corresponding to the plurality of the data lines, each first latch configured to latch the input image data in synchronization with a corresponding latch clock signal of the latch clock signals; and
    a plurality of second latches, each configured to latch an output of a corresponding first latch of the first latches in response to a load signal from the timing controller.

7. The display apparatus of claim 6, wherein odd-numbered second latches of the second latches output a first data signal applied to the pixels connected to first data lines of the plurality of the data lines, and even-numbered second latches of the second latches output a second data signal applied to the pixels connected to second data lines of the plurality of the data lines.

8. The display apparatus of claim 4, wherein the latch part comprises:
a first mode controller configured to output a first mode signal in response to the shift start pulse signal and a load signal from the timing controller;
a plurality of first latches respectively corresponding to the plurality of the data lines, each of the first latches configured to latch the input image data in synchronization with a corresponding latch clock signal of the latch clock signals;
a plurality of calculation circuits respectively corresponding to even-numbered latches of the first latches; and
a plurality of second latches, each configured to latch outputs of odd-numbered first latches of the first latches and the calculation circuits in response to the load signal, and
wherein each of the calculation circuits is configured to output an output of a corresponding first latch of the first latches to a corresponding second latch of the second latches when the first mode signal has a first level and output a calculation result signal based on the outputs of the odd-numbered first latches adjacent each other to the corresponding second latch when the first mode signal has a second level.

9. The display apparatus of claim 8, wherein each of the calculation circuits outputs the calculation result signal corresponding to an average of the outputs of the odd-numbered first latches adjacent each other to the corresponding second latch when the first mode signal has the second level.

10. The display apparatus of claim 4, wherein the latch part comprises:
a mode controller that outputs a mode signal in response to the shift start pulse signal and a load signal from the timing controller;
a plurality of first latches respectively corresponding to the plurality of the data lines, each of the first latches configured to latch the input image data in synchronization with a corresponding latch clock signal of the latch clock signals;
a plurality of second latches respectively corresponding to the first latches, each of the second latches configured to latch an output of a corresponding first latch of the first latches in response to a corresponding latch clock signal of the latch clock signals;
a plurality of calculation circuits respectively corresponding to the second latches; and
a plurality of third latches, each configured to latch an output of a corresponding calculation circuit of the calculation circuits in response to the load signal, and
wherein each of the calculation circuits is configured to output an output of a corresponding second latch of the second latches to a corresponding third latch of the third latches when the mode signal has a first level and outputs a calculation result signal to the corresponding third latch based on input and output of a corresponding first latch of the first latches when the mode signal has a second level.

11. The display apparatus of claim 10, wherein each of the calculation circuits is configured to output the calculation result signal corresponding to an average of the input and output of the corresponding first latch to the corresponding second latch when the mode signal has the second level.

12. A data driver comprising:
a resolution control circuit that is configured to output a shift start pulse signal activated when odd-numbered gate lines are driven, in response to a first start pulse signal and a resolution control signal;
a shift register configured to start a shift operation in response to the shift start pulse signal to sequentially output a plurality of latch clock signals respectively corresponding to a plurality of data lines;
a latch part configured to latch input image data in response to the latch clock signals;
a digital-to-analog converter configured to convert a digital signal output from the latch part to an analog signal; and
an output buffer configured to amplify the analog signal output from the digital-to-analog converter to drive the plurality of the data lines,
wherein the latch part is configured to apply the input image data to pixels connected to the odd-numbered data lines as first image data and apply a second image data to the even-numbered data lines when the resolution control signal indicates an up-scaling mode, wherein the second image data for a corresponding one of the even-numbered data lines is based on data of the first image data applied to a first one of the odd-numbered data lines preceding the one even-numbered data line and a second one of the odd-numbered data lines following the one even-numbered data line, and
wherein the resolution control circuit comprises:
a flip-flop configured to latch the first start pulse signal to output a second start pulse signal;
a logic circuit configured to receive the first start pulse signal and the second start pulse signal to output a third start pulse signal; and
a multiplexer configured to output one of the first and third start pulse signals in response to the resolution control signal as the shift start pulse signal.

13. The data driver of claim 12, wherein the latch part comprises:
a first mode controller that outputs a first mode signal in response to the shift start pulse signal and a load signal;
a plurality of first latches respectively corresponding to the plurality of the data lines, each of the first latches configured to latch the input image data in synchronization with a corresponding latch clock signal of the latch clock signals;
a plurality of calculation circuits respectively corresponding to even-numbered first latches of the first latches; and
a plurality of second latches, each configured to latch outputs of odd-numbered first latches of the first latches and the calculation circuits in response to the load signal, and
wherein each of the calculation circuits is configured to output an output of a corresponding first latch of the first latches to a corresponding second latch of the second latches when the first mode signal has a first level and output a calculation result signal based on the outputs of the odd-numbered first latches adjacent each other to the corresponding second latch when the first mode signal has a second level.

14. The data driver of claim 12, wherein the second image data for the one even-numbered data line is an average of the data applied to the two odd-numbered data lines.

15. A data driver comprising:
a driver circuit configured to receive a resolution control signal set to one of a normal mode and an up-scaling mode and generate a shift start pulse signal, wherein the driver circuit is configured to output a data signal based on image data to a row of pixels connected to a first gate line, and to an adjacent row of pixels connected to a second gate line adjacent the first gate line, in response to the shift start pulse signal when the resolution control signal is set to the up-scaling mode, wherein the image data comprises first image data of a color and second image data of the color, wherein a first one of the pixels of each row receives the first image data, a second one of the pixels of each row receives the second image data, and a third one of the pixels of each row between the two pixels receives an average of the first image data and the second image data, when the resolution control signal is set to the up-scaling mode, wherein the driver circuit comprises:

a toggle flip-flop having a data input terminal and a clock input terminal both configured to receive a first start pulse signal;

an AND gate configured to receive the first start pulse signal and an output of the toggle flip-flop;

a multiplexer configured to output one of the output of the AND gate and the first start pulse signal as the shift start pulse signal based on the resolution control signal; and a shift register configured to control output of the image data based on receipt of the shift start pulse signal.

* * * * *